United States Patent Office 3,769,229
Patented Oct. 30, 1973

3,769,229
DAYLIGHT FLUORESCENT PIGMENTS AND
PROCESS FOR PREPARING THEM
Siegfried Noetzel, Mainz, Germany, assignor to Farbwerke
Hoechst Aktiengesellschaft vormals Meister Lucius &
Bruning, Frankfurt am Main, Germany
No Drawing. Filed Nov. 9, 1971, Ser. No. 197,154
Claims priority, application Germany, Nov. 11, 1970,
P 20 55 448.7; Feb. 2, 1971, P 21 04 716.5
Int. Cl. C09k 1/02
U.S. Cl. 252—301.2 R                    5 Claims

ABSTRACT OF THE DISCLOSURE

New daylight fluorescent pigments which contain an organic fluorescent dyestuff and as base resin a condensation resin consisting of a polyester condensate of a dicarboxylic acid and of a bi- and/or polyfunctional alcohol or of a bifunctional alcohol and a di- and/or polyfunctional carboxylic acid, which condensate is cross-linked with an unplasticized, alcohol-modified urea or aminotriazine formaldehyde resin, and a process for their preparation, which comprises incorporating the organic fluorescent dyestuff into the condensation resin.

These daylight fluorescent pigments may be employed for preparing fluorescent paints, for example air-drying lacquers on the basis of alkyl resin or physically drying lacquers on the basis of acrylic resins, as well as for preparing fluorescent printing inks such as inks for screen printing, intaglio printing, book printing and offset-litho printing. Due to their high resistance to heat, they are particularly suitable for fluorescent dyeing of plastics and enamels.

---

The present invention relates to new daylight fluorescent pigments, which contain an organic fluorescent dyestuff and as resin a condensation resin consisting of a polyester condensate of a dicarboxylic acid and of a bi- and/or polyfunctional alcohol or of a bifunctional alcohol and a di- and/or polyfunctional carboxylic acid, which resins are cross-linked with an unplasticized, alcohol-modified urea or aminotriazine formaldehyde resin. The invention also relates to a process for preparing the daylight fluorescent pigments, which comprises incorporating the organic fluorescent dyestuff into the condensation resin.

As polyester condensates capable of being cross-linked and containing reactive groups, there are considered polyester resins containing hydroxyl and carboxyl groups, which are prepared from organic dicarboxylic acids or their reactive derivatives such as esters or anhydrides and bi- and/or polyfunctional alcohols or from organic di- and/or polyfunctional carboxylic acids, their esters or anhydrides and bifunctional alcohols. As example for bi- and polyfunctional organic carboxylic acids and alcohols there may be considered the following compounds: saturated aliphatic, aromatic and cycloaliphatic carboxylic acids such as adipic acid, phthalic acid, isophthalic acid, terephthalic acid, trimellithic acid and cyclohexane-dicarboxylic acid-(1,4) as well as saturated aliphatic, aromatic and cycloaliphatic alcohols such as ethylene glycol, butane-diol-1,4, hexane-diol-1,6, glycerol, trimethylol propane, trimethylol ethane, pentaerythritol, 1,4-dihydroxy-methyl-benzene and 1,4-dihydroxy-methyl cyclohexane. Suitable compounds are furthermore unsaturated oligofunctional carboxylic acids and alcohols such as fumaric acid, maleic acid and butene-2-diol-1,4, which are employed in mixture with saturated oligofunctional carboxylic acids or alcohols and provide unsaturated polyesters.

The polyester resins are preferably prepared by melting condensation at temperatures ranging above the melting points of the starting products or of the condensation product formed, if desired in the presence of transesterification catalysts, such as zinc, calcium or manganese acetate and condensation catalysts such as antimony trioxide. The proportions of acid to alcohol components may vary within wide limits; they depend on the properties desired of the final product. Similar condensation reactions have been carried out as indicated in German patent specification No. 961,575. The conditions for condensation have to be chosen in such a way that a premature cross-linking is avoided and condensation products of a relatively low molecular weight and a good compatibility towards the cross-linking resins are obtained. Facts have shown that in the condensation of a dicarboxylic acid in form of a diester, such as dimethylol terphthalic acid ester, with a triol, such as glycerol or trimethylol propane, a molar ratio of acid to alcohol component of 1:2 to 1:0.5 is preferably used. Instead of the free carboxylic acids there may also be employed the esters thereof or optional anhydrides, as for example the methyl or ethyl esters of the above-mentioned acids. It is also possible first to polycondensate a dicarboxylic acid in form of its ester with a diol in the presence of transesterification and condensation catalysts and to react subsequently this polycondensate in the melt with a tri- or polyfunctional alcohol. This method permits to obtain very branched polyesters having a high number of hydroxyl groups and a good compatibility towards the cross-linking resins.

As cross-linking resins there are employed urea and aminotriazine-formaldehyde condensates, as for example the unplasticized, alcohol-modified resins known from U.S. patent specification No. 2,498,592 and British patent specification No. 734,181, which resins are formed by condensing urea or aminotriazines with paraformaldehyde in alcohols at 110–120° C. Examples for aminotriazines are above all the 2,4-diamino-1,3,5-triazine,
the 2,4-diamino-6-methyl-1,3,5-triazine,
the 2,4-diamino-6-(3-hydroxy-butyl)-1,3,5-triazine,
the 2,4-diamino-6-heptyl-1,3,5-triazine,
the 2,4-diamino-6-phenyl-1,3,5-triazine,
the 2,4-diamino-6-benzyl-1,3,5-triazine,
the 2,4,6-triamino-1,3,5-triazine (melamine),
the 2,4-diamino-6-($\beta$-cyanoethyl)-1,3,5-triazine and
the 2,4-diamino-6-($\omega$-cyanovalero)-1,3,5-triazine and mixtures thereof.

For preparing the condensation resins according to the invention, solutions of the polyester condensates are mixed at room temperature with the cross-linking resins dissolved in alcohol, and cured at 130°–180° C., if desired in vacuo, the solvent being eliminated. As solvent for the polyester condensates there are preferably considered lower aliphatic alcohols or mixtures thereof with xylenes in the ratio of 1:9 to 9:1 parts by volume. The solutions of the polyester condensates and of the cross-linking resins have concentrations of about 40–60 percent by weight.

In order to improve the brittleness of the ready resins, 0.5 to 20, preferably 2 to 10% by weight of an acid catalyst may be added to the mixture to be cured. As acid catalysts there are considered for example oxalic acid, adipic acid, p-toluene sulfonic acid, d,l-camphor sulfonic acid, lactic acid, chloro-acetic acid amide, phosphoric acid, phosphoric acid ester, glycerol-dichloro-hydrine, sodium salts of halogen carboxylic acids and ammonium chloride. The amount of resin added depends on the type of the cross-linking resin and on the desired degree of hardness and brittleness of the resin formed. In general, the ratio of the polyester resin to the cross-linking resin may vary from 85:15 to 10:90 parts by weight.

It is possible to add to the mixture of polyester resin and cross-linking resin epoxide resins, for example reaction products of bisphenol A and epichloro-hydrine, which contain at least two epoxide groups. While curing, these epoxide resins react with the hydroxyl or carboxyl groups and impart to the ready resins according to the invention a good hardness and resistance to solvents. The amount of epoxide resin added may range between 5 and 30 percent by weight, calculated on the total amount of polyester resin and cross-linking resin. The condensation resins thus-obtained are characterized by a good transparency and by a sufficient resistance to organic solvents, oxygen and moisture. They have also a better fastness to heat and to light than the resins known from U.S. patent specifications Nos. 2,498,592, 2,809,954, 2,938,873, 3,116,256 and 3,412,036, British specifications Nos. 734,181, 748,484, 792,616 and 1,048,983 and German patent specification No. 961,575. These properties render the resins according to the invention particularly suitable for being used in daylight fluorescent pigments. These pigments consist of a colorless, finely ground base resin, into which a fluoroscent dyestuff has been incorporated. Such daylight fluorescent pigments are used more and more in the lacquer, printing ink and plastics industry and in the field of textile materials and for coating paper.

The fluorescent dyestuffs may be incorporated in known manner into the base resins according to the invention. Thus, they may be dissolved or dispersed either in the mixture of the polyester resin and cross-linking resin solution to be condensed or in the individual resin solutions and the resin may be subsequently cured. The dyestuffs may also be used in such a form as to be chemically bound to the individual resins.

The cured product thus-obtained is then converted into a finely divided form by dry or wet grinding in a ball or perl mill. Grinding is expediently carried out in the presence of water. The particle size of the daylight fluorescent pigment, which may vary within wide limits, depends to a large extent on the application field desired. Thus, the average particle size of the daylight fluorescent pigment generally ranges between about 5 and 30$\mu$, if it shall be used for preparing printing inks for silk screen printing or for preparing lacquers, and between about 0.1 and 5$\mu$, if printing inks shall be prepared.

As fluorescent dyestuffs there are considered organic compounds which are fluorescent by daylight in dissolved or solid, crystalline form, as for example fluorescent dyestuffs of the rhodamine, sulfo-rhodamine or naphthalimide series. Moreover, the dyestuffs described in French patent specifications Nos. 1,590,506, 1,444,489, 1,488,113 and 1,470,793 may be used.

The concentration of the dyestuff in the resin depends above all on the type of the resin, on the dyestuff used and on the desired application of the daylight pigment. The dyestuff concentration generally ranges between about 0.1 and 10 percent by weight. The daylight pigment preferably contains the dyestuff in a concentration, which provides the best possible brilliancy, the tinctorial strength of the product dyed with this dyestuff being good.

The daylight fluorescent pigments according to the invention may be employed for preparing fluorescent paints, for example air-drying lacquers on the basis of alkyl resin or physically drying lacquers on the basis of acrylic resins, as well as for preparing fluorescent printing inks such as inks for screen printing, intaglio printing, book printing and offset-litho printing. Due to their high resistance to heat, they are particularly suitable for fluorescent dyeing of plastics, which are usually proceeded between 200° and 300° C., and of enamels which are stoved above 150° C.

The following examples illustrate the invention.

EXAMPLE 1

Under a nitrogen atmosphere, 194 parts of dimethyl terephthalate, 201 parts of 1,1,1-trimethylol propane and 0.058 parts of manganese-(II)-acetate were heated within one hour in the oil-bath to a temperature of 150° C., until the mass was melted. The temperature of the oil bath was increased while stirring to 250° C., in such a way that for one hour respectively, an oil-bath temperature of 175°, 200°, 225° and 250° C. was maintained. During this reaction time, 47 parts of methanol were distilled off, corresponding to 73% of the theoretical amount. The resulting hot viscous polyester resin was poured off. While cooling, it solidified to form a transparent, slightly viscous product, which could be dissolved in the heat in xylene/butanol (50/50 parts by volume) and had a hydroxyl number of 377-380.

For preparing the cross-linking resin solution, 126 parts of melamine and 180 parts of paraformaldehyde were heated in 306 parts of n-butanol for 3 hours to 110°-120° C. The solution obtained had a content of solids of 50%, determined as stoving residue at 150° C. during 5 hours.

A 50% solution of the above polyester resin in xylene/butanol (1:1) was mixed with the above-described 50% melamine-formaldehyde-cross-linking resin solution, the proportions being 80:20, 60:40 and 40:60 and cured at 150° C. in vacuo (300 mm. of Hg) during 17 and a half hours. Water-clear cured products of a high brittleness were obtained, which decomposed at temperatures between 300 and 330° C.

For preparing a daylight fluorescent pigment, 4% of 10-methoxy-benzoxanthene - 3,4 - dicarboxylic acid hydrazide were added when the cross-linking resin solution was prepared, and the reaction was continued in the same way as indicated above. The fluorescent dyestuff could also be stirred, if desired, into the ready cross-linking resin solution. Thus, cured products were obtained, which had an intense green yellow fluorescence and decomposed at temperatures of from 300° to 330° C. For converting the cured products into a daylight fluorescent pigment, they were finely ground in a ball mill.

4 parts of the daylight fluorescent pigment thus-obtained were mixed for one hour in a porcelain ball mill on the roller with 96 parts by weight of n-polystyrene, which was pulverized in a hammer mill. Then the mixture was molded for 5 minutes at 240° C. The pressed plate obtained had an intense green yellow fluorescence.

Instead of the above-mentioned melamine-formaldehyde-resin solution, there may also be used resin solutions for cross-linking purposes, prepared from 551 parts of benzoguanamine, 360 parts of paraformaldehyde and 910 parts of n-butanol or from 120 parts of acetoguanamine, 120 parts of paraformaldehyde and 250 parts of n-butanol.

If in the above example the copolymerizate resin is replaced by a sulfonamide resin, prepared by melting condensation, at 140°-150° C., of 1710 parts of p-toluene sulfonamide and 600 parts of paraformaldehyde, cured products were obtained which changed their color already at about 200° C. and decomposed at 220°-250° C.

EXAMPLE 2

Under a nitrogen atmosphere, 194 parts of dimethyl terephthalate, 134 parts of 1,1,1-trimethylol propane and 0.058 part of manganese-(II)-acetate were heated for about half an hour in the oil-bath to a temperature of 150° C. until the mass was melted. Then the oil-bath temperature was increased within 4 hours to 250° C., while stirring continuously, until 54.5 parts of methanol, corresponding to 85% of the theoretical amount, were distilled off. While cooling, the resulting viscous mass solidified to form a slightly viscous product, which could be dissolved in the heat in xylene/butanol (50/50 parts by volume) and had a hydroxyl number of 304-307.

A 50% solution of the polyester resin thus-obtained in xylene/butanol (1:1), which contained 10 parts by volume of dimethyl formamide was mixed with a 50% melamine-formaldehyde resin solution in butanol according to Example 1 at room temperature, the ratios being 80:20, 60:40, 40:60, and subsequently cured in vacuo at 150° C. (300 mm. of Hg) during 17½ hours. The brittle cured products were water-clear and decomposed at temperatures of from 290 to 320° C.

For preparing a daylight fluorescent pigment, the above-described polyester resin solution was mixed at room temperature with the melamine formaldehyde resin solution according to Example 1, which contained 4% of the 10-methoxy-benzo-xanthene-3,4-dicarboxylic acid hydrazide, the ratios being 60:40 and 40:60, and cured at 150° C. in vacuo (300 mm. of Hg) in 17½ hours. After grinding, the cured products resulted in daylight fluorescent pigments of an intense green yellow fluorescence, which decomposed at 290°–320° C.

Instead of the 10-methoxy-benzoxanthene-3,4-dicarboxylic acid hydrazide, the following fluorescent dyestuffs may be used (the fluorescent shades are indicated): benzoxanthene-3,4-dicarboxylic acid imide (green), benzoxanthene-3,4-dicarboxylic acid - N - 3'- sulfonamido-phenyl imide (green), benzothioxanthene-3,4-dicarboxylic acid stearylic imide (greenish yellow), benzothioxanthene-3,4-dicarboxylic acid hydrazide (greenish yellow), 4-amino-1,8-naphthal-2',4'-dimethyl phenyl imide (green) or 7-oxo-14-thia-dibenzo(b,d,e,f)-chrysene (orange yellow).

4 parts of the daylight fluorescent pigment obtained according to the above example, were mixed for 5 minutes at 100° C. with 90 parts of a pulverized polyvinyl chloride, which contained 3% of an organic tin stabilizer and 1% of oxystearine acid on a double roller mixer. The resulting coat was stripped off and compression-molded for 5 minutes at 170° C. The pressed sheet obtained had an intense green-yellow fluorescence.

EXAMPLE 3

Under a nitrogen atmosphere, 194 parts of dimethyl terephthalate, 204 parts of pentaerythrite and 31 parts of ethylene glycol as well as 0.058 part of manganese-(II)-acetate were heated for about half an hour in the oil-bath to a temperature of 170° C. Then the oil-bath temperature was increased during 4 hours to 250° C., while stirring, until 64 parts of methanol corresponding to 100% of the theoretical amount were distilled off. After cooling, a slightly viscous solid resin was obtained, which was soluble in the heat in xylene/butanol (1:1) and had a hydroxyl number of 684–689.

A 50% solution of the above polyester resin in xylene/butanol (1:1), which contained 20 parts by volume of dimethyl formamide, was mixed with a 50% melamine formaldehyde resin solution in butanol according to Example 1 at room temperature, the ratios being 80:20, 60:40 and 40:60, and subsequently cured in vacuo at 150° C. (300 mm. of Hg) during 17½ hours. The cured products were water-clear and had a high degree of brittleness. They decomposed at temperatures of from 280–310° C.

For preparing a daylight fluorescent pigment, a 50% solution of the above polyester resin in xylene/butanol (1:1), which contained 20 parts of dimethyl formamide, was mixed at room temperature with a 50% melamine-formaldehyde resin solution in butanol according to Example 1, which contained 4% by weight of 10-methoxy-benzoxanthene-3,4-dicarboxylic acid hydrazine, the ratios being 60:40 and 40:60, and cured at 150° C. in vacuo 3(00 mm. of Hg) in 17½ hours. The cured products decomposed at temperatures of from 280°–310° C. They were subsequently ground in usual manner and yielded a daylight fluorescent pigment of an intense green yellow fluorescence.

For preparing an enamel, 20 parts of the daylight fluorescent pigment obtained according to the above example were ground for 20 minutes on the paint-shaker together with 45 parts of xylene, 25 parts of a 60% solution of a short-oil, non-drying alkyl resin from 37% of oil (triglyceride) and 40% of phthalic acid anhydride in xylene and with 10 parts of a 50% solution of a non-plasticized melamine resin in alcohols and aromatic hydrocarbons in the presence of quartzite perls (2–3 mm. Ø) in a 200 ml. plastic beaker. The lacquer obtained was sprayed on white-coated test plates (30 x 30 cm.) and stoved for 20 minutes at 160° C. The resulting laquer had an intense green yellow fluorescence.

EXAMPLE 4

Under a nitrogen atmosphere, 200 parts of dimethyl terephthalate, 162 parts of ethylene glycol and 0.0046 part of zinc acetate were heated for about 45 minutes in the oil-bath to a temperature of 175° C. and maintained at 175–220° C., until 82.4 parts of methanol were separated. This value corresponded to the theoretical amount of methanol. After cooling 0.061 part of antimony trioxide were added, the solidified transesterification product was melted and stirred for about 30 minutes at a temperature of 250° C. Then a vacuum atmosphere was produced, and the pressure was reduced in 1 and a half hours from 600 to 10 mm. of Hg. After stirring at 275° C. for about 45 minutes in the complete vacuum of an oil pump, the condensation was finished. The melt was cooled under nitrogen. The polyethylene glycol terephthalate thus obtained had a specific viscosity of about 700–800, calculated in a 1% concentration in phenol/tetrachloroethane (3:2 parts by weight) at 140° C.

Under nitrogen, 600 parts of the above-mentioned polyethylene glycol terephthalate were heated with 402 parts of 1,1,1-trimethylol propane, while stirring, in the oil bath to 187° C. (temperature of the initial bath). The internal temperature was then increased to 240° C. in 2¼ hours, 50 parts of ethylene glycol being distilled off. After cooling, a viscous polyester resin having a hydroxyl number of from 417 to 421 was obtained.

A 50% solution of the above polyester resin in xylene-butanol (1:1) was mixed at room temperature with a 50% melamine formaldehyde resin solution in butanol according to Example 1, the ratios being 60:40 and 40:60, and cured at 150° C. in vacuo (300 mm. of Hg) during 17½ hours. The cured products were water-clear and decomposed at temperatures of from 320°–340° C.

A 50% solution of the above polyester resin in xylene/butanol (1:1) was mixed at room temperature with a 50% melamine formaldehyde resin solution in butanol, which contained 4% by weight of 10-methoxy-benzoxanthene-3,4-dicarboxylic acid hydrazide according to Example 1, the ratios being 60:40 and 40:60, and cured at 150° C. in vacuo (300 mm. of Hg) for 17½ hours. The cured products thus-obtained of an intense green-yellow fluorescence decomposed at 320°–340° C. After grinding they yielded in usual manner a daylight fluorescent pigment very fast to light.

EXAMPLE 5

Under nitrogen 194 parts of dimethyl terephthalate, 201 parts of 1,1,1-trimethylol propane and 0.058 part of manganese-(II)-acetate were heated within half an hour in the oil-bath to a temperature of 150° C., until the mass was melted. The oil-bath temperature was then increased to 250° C., so that an oil bath temperature of 175°, 200°, 225° and 250° C. was maintained for one hour each time. During this reaction time, 47 parts of methanol, corresponding to 73% of the theoretical amount were distilled off. The resulting hot and viscous polyester resin was poured off. When cooling, it solidified to form a transparent, slightly viscous product, which was soluble in the heat in xylene/butanol (50/50 parts by volume) and had a hydroxyl number of from 377 to 380.

For preparing the cross-linking resin solutions, 126 parts of melamine and 180 parts of paraformaldehyde were heated for 3 hours to 110°–120° C. The resulting solution had a content of solids of 50%, determined as stoving residue at 150° C. during 5 hours.

60 parts of the above polyester resin in form of a 50% solution in xylene/butanol (50/50 parts by volume) were mixed at room temperature with 40 parts by weight of a melamine formaldehyde resin in form of a 50% solution in butanol, which contained 2% by weight of the 10-methoxy-benzoxanthene-3,4-dicarboxylic acid hydrazide, and after addition of 4 parts by weight of adipic acid, cured at 150° C. in vacuo (300 mm. of Hg) for 15 hours. The solid cured product had an intense green yellow fluorescence and was extremely brittle. It was ground in a ball or vibratory mill. Instead of adipic acid, the same amount of d,1-campher-sulfonic acid may be used as curing catalyst.

I claim:

1. A daylight fluorescent pigment consisting essentially of: (1) an organic fluorescent dyestuff; and (2) as base resin, a condensation resin consisting of a polyester condensate of a dicarboxylic acid and of a bifunctional alcohol, polyfunction alcohol or combinations thereof or of a bifunctional alcohol and a difunction carboxylic acids, polyfunctional carboxylic acids or combinations thereof which condensate is cross-linked with an unplasticized, alcohol-modified urea or aminotriazine formaldehyde resin.

2. A daylight fluorescent pigment as claimed in claim 1, which contains as fluorescent dyestuff a dyestuff of the benzoxanthane, or benzothioxanthene series.

3. A daylight fluorescent pigment consisting essentially of:
(a) an organic fluorescent dyestuff; and
(b) a condensation resin consisting essentially of a polyester condensate of (1) a dicarboxylic acid or the ester or anhydride thereof and a bifunctional alcohol, polyfunction alcohol or combinations thereof, or (2) a bifunctional alcohol and a difunctional carboxylic acids, polyfunctional carboxylic acids or combinations thereof or the ester or anhydride thereof, said di- and polyfunctional organic carboxylic acid being selected from the group consisting of adipic acid, phthalic acid, isophthalic acid, terephthalic acid, trimellithic acid and cyclohexane-dicarboxylic acid-(1, 4) or the esters or anhydrides thereof and said bi- and polyfunctional alcohol being selected from the group consisting of ethylene glycol,
butane-diol-1,4,
hexane-diol-1,6,
glycerol,
trimethylol propane,
trimethylol ethane,
pentaerythritol,
1,4-dihydroxy-methyl-benzene and
1,4-dihydroxymethyl cyclohexane, cross-linked with an unplasticized, alcohol-modified, urea or aminotriazine formaldehyde resin said aminotriazine being selected from the group consisting of 2,4-diamino-1,3,5-triazine,
2,4-diamino-6-methyl-1,3,5-triazine,
2,4-diamino-6-(3-hydroxy-butyl)-1,3,5-triazine,
2,4-diamino-6-heptyl-1,3,5-triazine,
2,4-diamino-6-phenyl-1,3,5-triazine,
2,4-diamino-6-benzyl-1,3,5-triazine,
2,4,6-triamino-1,3,5-triazine (melamine),
2,4-diamino-6-($\beta$-cyano-ethyl)-1,3,5-triazine and
2,4-diamino-6-($\omega$-cyanovalero)-1,3,5-triazine and mixtures thereof.

4. A daylight fluorescent pigment as recited in claim 3 wherein the ratio of the polyester resin to the cross-linking resin is from 85:15 to 10:90 parts by weight.

5. A daylight fluorescent pigment as recited in claim 3 wherein said fluorescent dyestuff is a dyestuff of the benzoxanthene- or benzothioxanthene series.

References Cited
UNITED STATES PATENTS

| | | | |
|---|---|---|---|
| 2,938,873 | 5/1960 | Kazenas | 252—301.3 R |
| 3,222,418 | 12/1965 | Murdock | 260—856 |
| 3,382,294 | 5/1968 | Christenson et al. | 260—856 |
| 3,412,036 | 11/1968 | McIntosh | 260—856 |
| 3,532,768 | 10/1970 | Dalibor et al. | 260—850 |
| 3,532,769 | 10/1970 | Dalibor et al. | 260—850 |
| 3,532,770 | 10/1970 | Dalibor et al. | 260—850 |

DANIEL E. WYMAN, Primary Examiner

A. P. DEMERS, Assistant Examiner

U.S. Cl. X.R.

106—288 Q; 260—39 P, 40 R, 850, 856